(12) United States Patent
Kabe

(10) Patent No.: US 10,082,670 B2
(45) Date of Patent: Sep. 25, 2018

(54) DISPLAY DEVICE FOR VEHICLE

(71) Applicant: SUBARU CORPORATION, Tokyo (JP)

(72) Inventor: Keiko Kabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/808,535

(22) Filed: Nov. 9, 2017

(65) Prior Publication Data

US 2018/0157038 A1    Jun. 7, 2018

(30) Foreign Application Priority Data

Dec. 1, 2016   (JP) ................. 2016-233777

(51) Int. Cl.
*B60Q 1/00*       (2006.01)
*G02B 27/01*      (2006.01)
*G08G 1/16*       (2006.01)

(52) U.S. Cl.
CPC ......... *G02B 27/0101* (2013.01); *G08G 1/166* (2013.01); *G08G 1/167* (2013.01); *B60K 2350/1084* (2013.01); *B60R 2300/804* (2013.01); *B60R 2300/8093* (2013.01)

(58) Field of Classification Search
CPC .................................. B60T 7/22; B60R 1/00
USPC .... 340/435, 436, 438, 439, 903, 905, 995.1; 348/142, 148, 149
See application file for complete search history.

(56) References Cited

U.S. PATENT DOCUMENTS

| 7,482,909 B2 | 1/2009 | Haug |
| 8,508,383 B2 * | 8/2013 | Peterson ................... B60R 1/12 |
| | | 340/425.5 |
| 2007/0106471 A1 | 5/2007 | Yoshiguchi et al. |

(Continued)

FOREIGN PATENT DOCUMENTS

| JP | 07-200996 A | 8/1995 |
| JP | 11-126300 A | 5/1999 |

(Continued)

OTHER PUBLICATIONS

Non-Final Office Action issued in related U.S. Appl. No. 15/808,426, dated Jul. 5, 2018.

*Primary Examiner* — Tai T Nguyen
(74) *Attorney, Agent, or Firm* — McDermott Will & Emery LLP

(57) ABSTRACT

A display device for a vehicle includes a surrounding environment recognition unit and a display unit. The display unit displays a first vehicle icon corresponding to an own vehicle, line icons on both sides of the first vehicle icon, and an adjacent-lane icon sideward of a corresponding one of the line icons. The line icons and the adjacent-lane line icon are displayed, with clearances between them narrowing as is farther away from the first vehicle icon. The first vehicle icon is on fixed display. The line icons and the adjacent-lane line icon are on movable display, in a lateral direction of a display area. The surrounding environment recognition unit recognizes presence or absence of an obstacle in the adjacent lane. The display unit provides color-coded display of a display region corresponding to the adjacent lane, according to the presence or the absence of the obstacle.

18 Claims, 5 Drawing Sheets

(56) References Cited

U.S. PATENT DOCUMENTS

| | | | |
|---|---|---|---|
| 2010/0123778 A1* | 5/2010 | Hada | B60R 1/00 348/148 |
| 2012/0314055 A1 | 12/2012 | Kataoka | |
| 2014/0097968 A1* | 4/2014 | Kamiya | B60Q 1/0023 340/905 |
| 2014/0210604 A1* | 7/2014 | Kawashima | B60K 35/00 340/439 |
| 2015/0314783 A1 | 11/2015 | Nespolo et al. | |
| 2018/0157038 A1 | 6/2018 | Kabe | |

FOREIGN PATENT DOCUMENTS

| | | |
|---|---|---|
| JP | 2002-074596 A | 3/2002 |
| JP | 2007-125969 A | 5/2007 |

\* cited by examiner

DISPLAY DEVICE FOR VEHICLE

CROSS-REFERENCE TO RELATED APPLICATIONS

The present application claims priority from Japanese Patent Application No. 2016-233777 filed on Dec. 1, 2016, the entire contents of which are hereby incorporated by reference.

BACKGROUND

The technology relates to a display device for a vehicle that recognizes surrounding environment of a vehicle and provides display in a display area.

Japanese Unexamined Patent Application Publication (JP-A) No. 2002-74596 discloses one example of existing lane change assistance devices. In the lane change assistance device, rear sideward detection sensors are provided inside side mirrors on right and left sides of a vehicle. As the rear sideward detection sensor, an auto focusing camera may be used, for example. The auto focusing camera captures images rearward of the vehicle, to detect traveling environment including an obstacle right or left rearward of the vehicle. In a case where the obstacle is a surrounding vehicle, a control unit of the vehicle calculates, on the basis of imaging data, a distance to the surrounding vehicle, and a relative speed of the surrounding vehicle. Thus, the control unit displays information regarding the surrounding vehicle, on a display unit of the vehicle.

Specifically, an own-vehicle icon is displayed near an upper end of a central part of the display unit, with lines of segments being displayed from both sides of the own-vehicle icon toward a lower end of the central part of the display unit. In association with an operation of a turn signal of the vehicle, displayed is the line of the segments corresponding to a direction of indication of the turn signal. Display modes of the relevant line of the segments change in brightness or color, according to a degree of uncertainties. A driver looks at the line of the segments displayed on the display unit, to grasp the degree of the uncertainties in a lane to which the driver intends to make a lane change.

JP-A No. H7-200996 discloses one example of existing following distance alarm devices. The following distance alarm device mainly includes alarm equipment, a control unit, and accelerator turning-off detection equipment. The accelerator turning-off detection equipment detects a state in which the driver is stepping down an accelerator pedal, or a state in which the stepping-down of the accelerator pedal is released. In a case where the control unit determines possibility of collision with a frontward object unless an own vehicle decelerates, the alarm equipment gives the driver an alarm, calling for the driver's attention.

SUMMARY

A display device for a vehicle recognizes surrounding environment of a vehicle and provides display in a display area. In such a display device, it is desired to provide a driver with accurate surrounding information of the vehicle.

It is desirable to provide a display device for a vehicle that makes it possible to provide a driver with accurate surrounding information of a vehicle.

An aspect of the technology provides a display device for a vehicle. The display device includes a surrounding environment recognition unit and a display unit. The surrounding environment recognition unit is configured to recognize surrounding environment of a first vehicle as an own vehicle. The display unit includes a display area and is configured to display, in the display area, information to be notified to a driver, on the basis of a recognition result of the surrounding environment recognition unit. The display unit is configured to display a first vehicle icon substantially in a middle of the display area in a lateral direction of the display area. The first vehicle icon corresponds to the first vehicle. The display unit is configured to display line icons on right and left sides of the first vehicle icon on the condition that the surrounding environment recognition unit recognizes lane markers on right and left sides of an own-vehicle-traveling lane on which the first vehicle travels. The line icons correspond to the lane markers of the own-vehicle-traveling lane. The display unit is configured to display an adjacent-lane line icon sideward of a corresponding one of the line icons on the condition that the surrounding environment recognition unit recognizes a lane marker of an adjacent lane that is adjacent to the own-vehicle-traveling lane. The adjacent-lane line icon corresponds to the lane marker of the adjacent lane. The line icons and the adjacent-lane line icon are displayed, with a clearance between the line icons narrowing as is farther away from the first vehicle icon, and with a clearance between the corresponding one of the line icons and the adjacent-lane line icon narrowing as is farther away from the first vehicle icon. The first vehicle icon is on fixed display. The line icons and the adjacent-lane line icon are on movable display, in the lateral direction of the display area. The surrounding environment recognition unit is configured to recognize presence or absence of an obstacle in the adjacent lane. The display unit is configured to provide color-coded display of a display region between the corresponding one of the line icons and the adjacent-lane line icon, according to the presence or the absence of the obstacle in the adjacent lane. The display region corresponds to the adjacent lane.

An aspect of the technology provides a display device for a vehicle. The display device includes a detector, a display, and circuitry. The detector is configured to detect surrounding environment of a first vehicle as an own vehicle. The display includes a display area and is configured to display, in the display area, information to be notified to a driver. The circuitry is configured to allow the display to display the information on the basis of a detection result of the detector. The circuitry is configured to cause a first vehicle icon to be displayed substantially in a middle of the display area in a lateral direction of the display area. The first vehicle icon corresponds to the first vehicle. The circuitry is configured to cause line icons to be displayed on right and left sides of the first vehicle icon upon recognizing, on the basis of the detection result of the detector, lane markers on right and left sides of an own-vehicle-traveling lane on which the first vehicle travels. The line icons correspond to the lane markers of the own-vehicle-traveling lane. The circuitry is configured to cause an adjacent-lane line icon to be displayed sideward of a corresponding one of the line icons upon recognizing, on the basis of the detection result of the detector, a lane marker of an adjacent lane that is adjacent to the own-vehicle-traveling lane. The adjacent-lane line icon corresponds to the lane marker of the adjacent lane. The circuitry is configured to cause the line icons and the adjacent-lane line icon to be displayed, with a clearance between the line icons narrowing as is farther away from the first vehicle icon, and with a clearance between the corresponding one of the line icons and the adjacent-lane line icon narrowing as is farther away from the first vehicle icon. The circuitry is configured to cause the first vehicle icon to be on fixed display. The circuitry is configured to cause the line icons and the adjacent-lane line icon to be on movable display, in the lateral direction of the display area. The circuitry is configured to recognize presence or absence of an obstacle in the adjacent lane, and provide color-coded display of a display region between the corresponding one of the line icons and the adjacent-lane line icon, according to the presence or the absence of the obstacle in the adjacent lane. The display region corresponds to the adjacent lane.

DETAILED DESCRIPTION

Figure 1A:
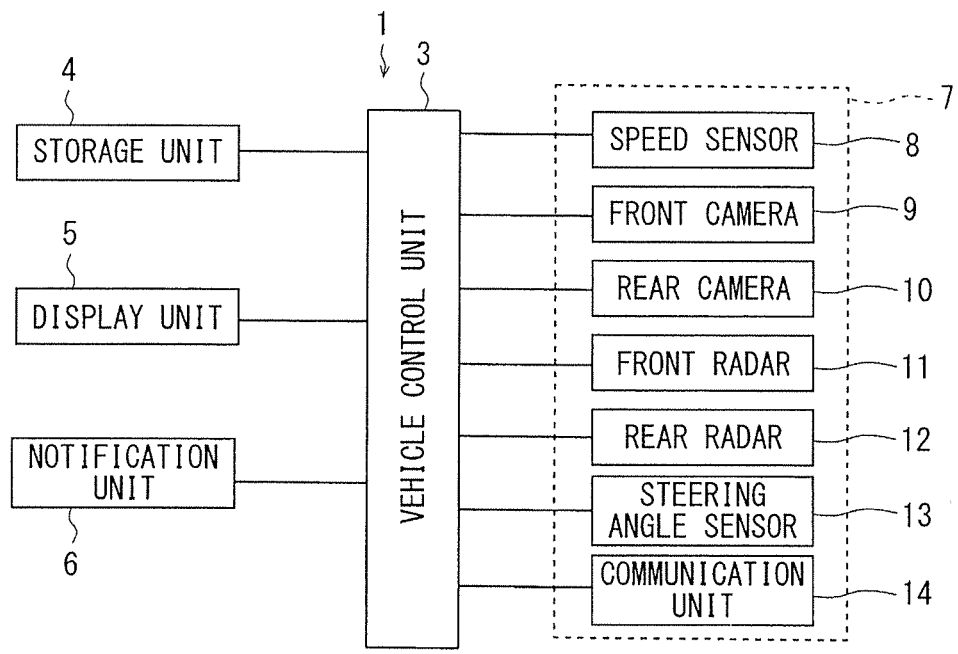
FIG. 1A is a block diagram in outline of a display device for a vehicle according to one implementation of the technology.

In the following, some implementations of the technology are described in detail with reference to the drawings. It is to be noted that in the description of the implementations, the same members are basically denoted by the same reference characters, with description thereof omitted to avoid redundancy.

Figure 1B:
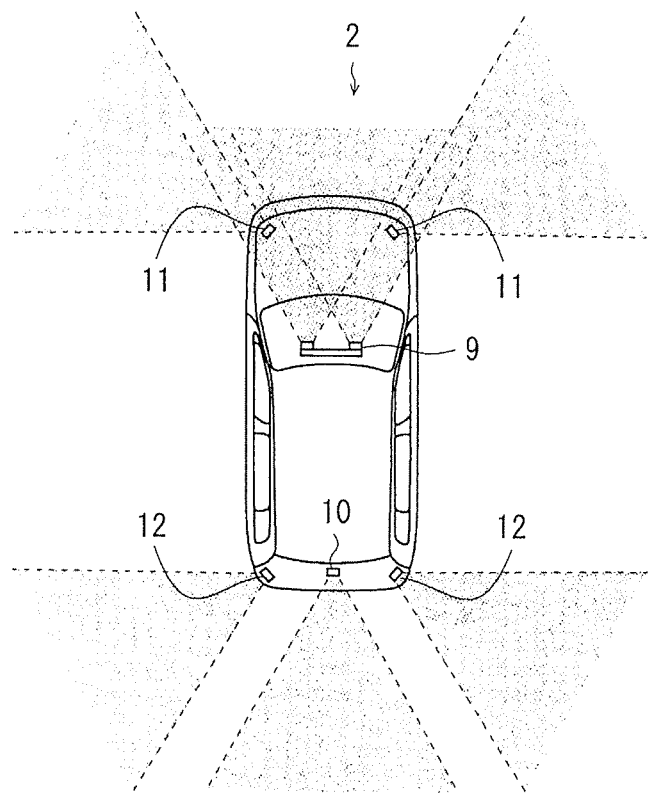
FIG. 1B illustrates a vehicle including the display device for the vehicle according to one implementation of the technology.
Figure 2A:
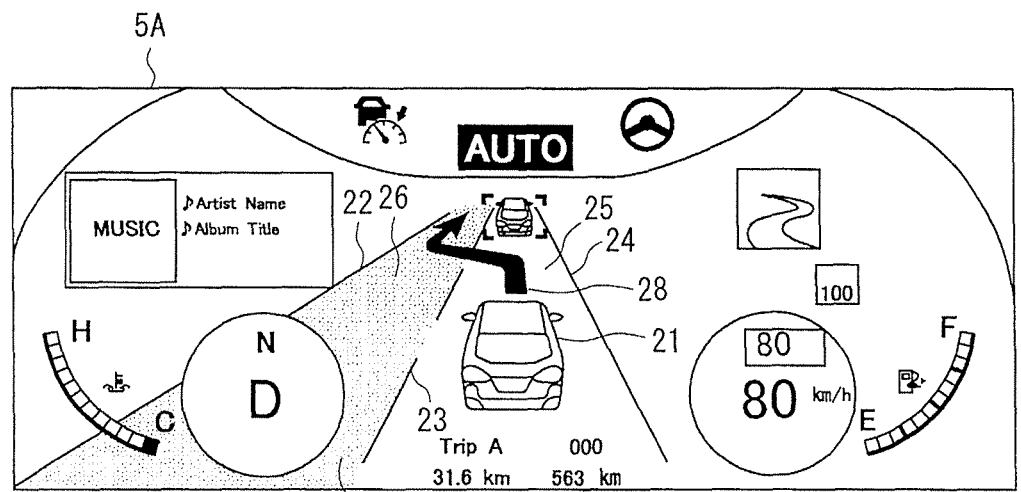
FIG. 2A illustrates the display device for the vehicle according to the implementation of the technology, and illustrates a display unit.
Figure 2B:
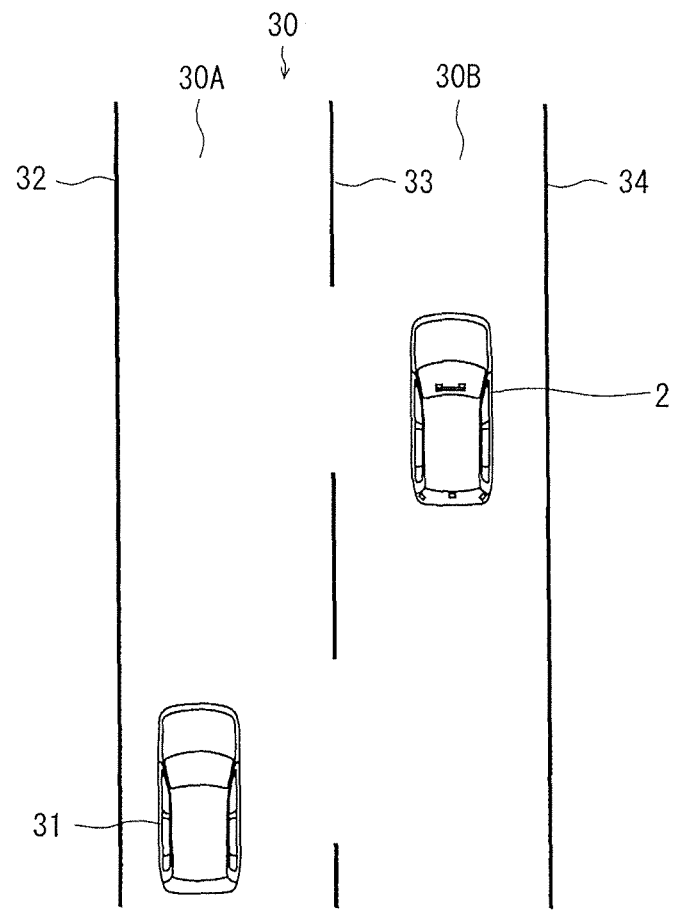
FIG. 2B illustrates the display device for the vehicle according to the implementation of the technology, and illustrates a traveling sate of the vehicle on a road.

FIG. 1A is a block diagram that illustrates in outline a display device 1 for a vehicle according to one implementation. FIG. 1B illustrates a vehicle 2 on which the display device 1 for the vehicle according to this implementation is mounted. FIG. 2A illustrates a display unit 5 of the display device 1 for the vehicle according to this implementation. FIG. 2B illustrates a traveling state on a road, of the vehicle 2 on which the display device 1 for the vehicle according to this implementation is mounted.

Referring to FIG. 1A, the display device I for the vehicle may be mounted on the vehicle 2, and mainly include a vehicle control unit 3, a storage unit 4, the display unit 5, a notification unit 6, and a surrounding environment recognition unit 7. Functions in outline of the display device 1 for the vehicle may include acquiring information regarding an obstacle forward and rearward of the vehicle 2 in an adjacent lane, and allowing the display unit 5 to display information on whether or not a lane change to the adjacent lane is allowable. The information regarding the obstacle may be acquired from the surrounding environment recognition unit 7. The adjacent lane is a lane adjacent to a traveling lane on which the vehicle 2 travels.

In one implementation of the technology, the vehicle 2 may serve as a "first vehicle". In one implementation of the technology, the display unit 5 may serve as a "display unit" or a "display". In one implementation of the technology, the surrounding environment recognition unit 7 may serve as a "surrounding environment recognition unit" or a "detector".

The vehicle control unit 3 may include, for example, a central processing unit (CPU), a read only memory (ROM), a random access memory (RAM). The vehicle control unit 3 may be, for example, an electronic control unit (ECU) that executes, for example, various kinds of calculations for a vehicle control. The vehicle control unit 3 may perform, for example, the various kinds of the calculations on the basis of a recognition result supplied from the surrounding environment recognition unit 7. Thus, the vehicle control unit 3 may control, for example, the display unit 5 and the notification unit 6, to inform the driver of information on the traveling lane on which the vehicle 2 travels and the adjacent lane.

In one implementation of the technology, the vehicle control unit 3, the display unit 5, and the surrounding environment recognition unit 7 may serve as "circuitry".

The storage unit 4 may include, for example, a non-volatile memory such as an electrically erasable programmable read-only memory (EEPROM). The storage unit 4 may store various kinds of data involved in the control of the vehicle 2. The storage unit 4 may store a map database, as one of the various kinds of the data. The map database may include, for example, a navigation database and a detailed map database. The navigation database may be used in a navigation unit. The detailed map database may include more detailed map data than that of the navigation database.

In the navigation database, stored may be map information related to traveling environment, without limitation. Non-limiting examples may include positions of intersections and traffic signals, the number of lanes of roads, radii of curvature of the roads, speed limitation, and no-passing sections. Positioning of an own-vehicle position on the map of the vehicle 2 may be made by, for example, global positioning system (GPS) satellites. The own-vehicle position may be displayed on the display unit 5. In the detailed map database, stored may be data on shapes of the roads, azimuths of the roads, classification of lane lines of the roads, and the number of lanes, without limitation. Non-limiting examples of the data on the shapes of the roads may include the radii of curvature, lane widths, shoulder widths of the roads on which the vehicle 2 travels. The detailed map database, in combination with the information on the own-vehicle position of the vehicle 2 positioning of which is made by the GPS satellites, may serve as the surrounding environment recognition unit 7 of the display device 1 for the vehicle.

The display unit 5 may include, for example, a display 5A as illustrated in FIG. 2A. The display 5A may be disposed in an instrument panel in front of the driver. It is to be noted that as the display unit 5, used may be an undepicted display that is disposed in an upper part near a central part of the instrument panel of the vehicle 2.

The notification unit 6 may output, for example, sound or an image. The sound may make a notification with the use of sense of hearing of an occupant. The image may make a notification with the use of sense of vision of the occupant. The notification by the sound may be made with the use of a speaker provided on the vehicle 2. The notification by the image may be made with the use of the display unit 5 provided in the vehicle 2.

The surrounding environment recognition unit 7 may recognize the traveling environment around the vehicle 2 through, for example, various kinds of sensors and cameras mounted on the vehicle 2. Non-limiting examples of the various kinds of the sensors and the cameras may include a vehicle speed sensor 8, a front camera 9, a rear camera 10, front radar 11, rear radar 12, a steering angle sensor 13, and a communication unit 14.

Referring to FIG. 1B, the various kinds of the sensors and the cameras may constitute the surrounding environment recognition unit 7, and be located at appropriate positions of the vehicle 2. Thus, the various kinds of the sensors and the cameras may be able to acquire surrounding information of the vehicle 2, as respectively indicated by sandy shaded regions.

The vehicle speed sensor 8 may be a sensor that measures a speed of the vehicle 2 on the basis of, for example, the number of rotations of an engine or tires.

The front camera 9 may be, for example, a stereo camera installed in an upper part near a front windshield in vehicle interior of the vehicle 2. The front camera 9 as the stereo camera may include, for example, a plurality of cameras. The plurality of the cameras each include an image sensor such as a charge coupled device (CCD) image sensor and a complementary metal oxide semiconductor (CMOS) image sensor. The front camera 9 may be a device that captures images of an object from different points of views. The front camera 9 may be unitized with, for example, an undepicted image processing engine. The image processing engine may recognize objects forward of the vehicle 2, e.g., lane lines of the roads, side walls, three-dimensional objects, and preceding vehicles, on the basis of captured images obtained by the stereo camera and on the basis of distance information obtained with the captured image. Various kinds of data obtained by the recognition processing may be transmitted, as the surrounding information forward of the vehicle 2, to the vehicle control unit 3, and be stored in the storage unit 4.

The front radar 11 may be, for example, radar provided at both right and left ends of a front end part of the vehicle 2. As the front radar 11, adopted may be millimeter wave radar. Adopting the front radar 11 makes it possible to calculate a distance from the vehicle 2 to an object that exists sideward or forward of the vehicle 2. Moreover, as the front radar 11, laser radar may be used, to recognize lane markers of the roads, e.g., lane lines. It is to be noted that various kinds of data acquired by the front radar 11 may be transmitted, as the surrounding information forward of the vehicle 2, to the vehicle control unit 3, and be stored in the storage unit 4.

The rear camera 10 may be disposed in a rear end part of the vehicle 2. This makes it possible to detect an object that exists rearward of the vehicle 2. The rear radar 12 may be disposed at both right and left ends of the rear end part of the vehicle 2. This makes it possible to calculate a distance from the vehicle 2 to an object that exists sideward or rearward of the vehicle 2. It is to be noted that the rear camera 10 may be also unitized with the undepicted image processing engine. Various kinds of data acquired by the rear camera 10 and the rear radar 12 may be transmitted, as the surrounding information rearward of the vehicle 2, to the vehicle control unit 3, and be stored in the storage unit 4.

The steering angle sensor 13 may be, for example, a sensor mounted on a steering wheel, and detect a steering angle. The vehicle control unit 3 may perform calculation of, for example, data on the steering angle and data on the lane markers acquired by, for example, the front camera 9 as mentioned above. Thus, the vehicle control unit 3 may calculate a yaw angle of the vehicle 2 with respect to lanes 30A and 30B of a road 30. The lanes 30A and 30B, and the road 30 are illustrated in FIG. 2B.

The communication unit 14 may perform road-vehicle communication and inter-vehicle communication, and receive the own-vehicle position from the GPS satellites. For the road-vehicle communication, for example, adopted may be a device that accords with an intelligent transport system (ITS). The communication unit 14 may receive light or radio wave beacon from road ancillary equipment, and thereby be able to acquire various kinds of information such as information on traffic congestion, weather information, and information on traffic regulation of a specific section.

In one implementation of the technology, the communication unit 14 may serve as a "communication unit".

FIG. 2A illustrates the display 5A inside the instrument panel in front of the undepicted steering wheel. In a central part of the display 5A, displayed may be an own-vehicle icon 21, and three pieces of line icons 22, 23, and 24. In a right lower part of the display 5A, displayed may be a speed meter and a fuel meter. In a left lower part of the display 5A, displayed may be a shift of an automatic transmission vehicle and a water temperature indicator.

Although details are described later, in the display 5A, the own-vehicle icon 21 is on fixed display. The line icons 22 to 24 are on movable display in a right-left direction of the display 5A. The line icons 23 and 24 may be displayed on right and left sides of the own-vehicle icon 21. A region 25 between the line icons 23 and 24 may correspond to an own-vehicle-traveling lane. A region 26 between the line icons 22 and 23 may correspond to an adjacent lane. As illustrated in the figure, the region 26 corresponding to the adjacent lane, being indicated by a sandy shade 27, may be displayed in blue, for example, in the display 5A. In other words, the display 5A provides color-coded display of the region 26, according to a degree of uncertainties involved in a lane change of the vehicle 2 to the adjacent lane. Hence, it is possible for the driver to intuitively grasp whether or not to make the lane change to the adjacent lane.

With the vehicle 2 making the lane change, the display 5A may display an arrow icon 28, together with the color-coded display of the region 26 corresponding to the adjacent lane. The arrow icon 28 may be displayed in a case where, for example, a determination is made that the lane change of the vehicle 2 is allowable. The arrow icon 28 may be directed from the traveling lane of the vehicle 2 toward the adjacent lane to which the lane change is allowable. In this implementation, because the vehicle 2 is traveling on a two-lane road, the arrow icon 28 may be directed from the region 25 corresponding to the traveling lane toward the region 26 corresponding to the adjacent lane. It is to be noted that in this implementation, the color-coded display of the region 26 corresponding to the adjacent lane and the display of the arrow icon 28 may be made simultaneously, but this is non-limiting. For example, either the color-coded display of the region 26 corresponding to the adjacent lane or the display of the arrow icon 28 may be made.

FIG. 2B illustrates a state in which the vehicle 2 is traveling on the road 30 that includes two lanes on each side. The road 30 may include, for example, the lanes 30A and 30B. FIG. 2B corresponds to display contents of the display 5A in FIG. 2A. The vehicle 2 may be traveling on the lane 30B on right side of the road 30. A surrounding vehicle 31 may be traveling rearward of the vehicle 2, on the lane 30A on left side of the road 30. The road 30 may be divided into the two lanes, e.g., the lanes 30A and 30B, on one side, by a lane marker 32 at a left end, a middle lane marker 33, and a lane marker 34 at a right end. The lane marker 33 may indicate permission of passing. The own-vehicle icon 21 as illustrated in FIG. 2A may correspond to the vehicle 2. The line icon 22 may correspond to the lane marker 32. The line icon 23 may correspond to the lane marker 33. The line icon 24 may correspond to the lane marker 34.

In one implementation of the technology, the own-vehicle icon 21 may serve as a "first vehicle icon". In one implementation of the technology, the line icons 22, 23, and 24 may serve as "line icons" and an "adjacent-lane line icon".

As described, in the vehicle 2, with the use of the rear camera 10 and the rear radar 12, calculated may be a clearance between the surrounding vehicle 31 traveling on the lane 30A and the vehicle 2, and the relative speed of the surrounding vehicle 31 with respect to the vehicle 2. The rear camera 10 and the rear radar 12 may be disposed in the rear end part of the vehicle 2. In a case where, for example, the vehicle 2 has a certain clearance from the surrounding vehicle 31, and the relative speed of the surrounding vehicle 31 is low, the vehicle control unit 3 may make the determination that the lane change of the vehicle 2 from the lane 30B to the lane 30A is allowable. Upon this determination, the region 26 corresponding to the adjacent lane may be displayed in blue, as illustrated in FIG. 2A. It is to be noted that although illustration is omitted in FIG. 2B, another undepicted surrounding vehicle may be traveling forward of the vehicle 2 on the lane 30B, and be recognized by the surrounding environment recognition unit 7 such as the front camera 9.

It is to be noted that the lane markers 32 to 34 as mentioned above may be lines that extend on the road 30 and define the traveling lane. The lane markers 32 to 34 may each be a solid line or a broken line, or any other patterned line. The lane markers 32 to 34 may each be a white line or a yellow line, or any other colored line. For example, the lane markers 32 to 34 such as white lines have properties of higher luminance than that of a surface of the road 30. With the use of the properties, the unit including the front camera 9 and the image processing engine may evaluate changes in luminance in a widthwise direction of the road 30 to identify, on an image plane, positions of the lane markers 32 to 34 on right and left sides of the image plane. It is to be noted that as mentioned above, in a case with the use of the laser radar as the front radar 11 as well, it is possible to identify the lane markers 32 to 34 with the use of the changes in the luminance.

With the front camera 9 being used as the surrounding environment recognition unit 7, there may be a case where the front camera 9 is not able to recognize the lane markers 32 to 34, for example, because of thinning of the lane markers 32 to 34 on the road 30, or during night-time travel. In such situations, in many cases, the driver who is actually driving the vehicle 2 may also fail in visually recognizing the lane markers 32 to 34. The display 5A does not display the line icons 22 to 24 corresponding to the lane markers 32 to 34 that are not recognized by the front camera 9. Thus, the display on the display 5A is consistent with a view the driver gets, making it possible for driver to easily and intuitively grasp the traveling environment around the own vehicle.

Figure 3:
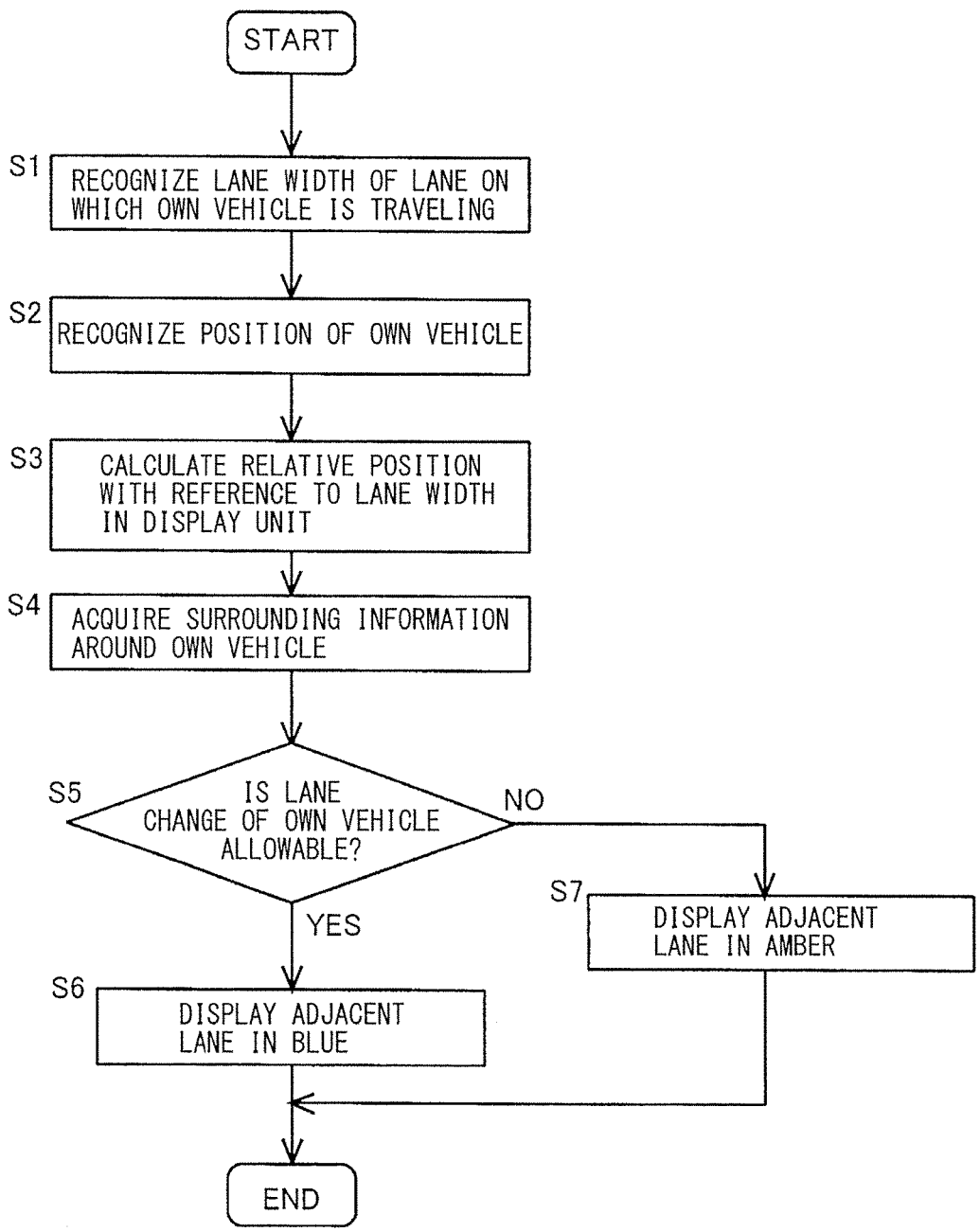
FIG. 3 is a flowchart that illustrates one example of control operation of the display device for the vehicle according to the implementation of the technology.

FIG. 3 is a flowchart of one example of control operation to provide display on the display unit 5 of the display device 1 for the vehicle according to this implementation. It is to be noted that description of the flowchart of FIG. 3 is made with reference to FIGS. 1A to 2B as appropriate.

Referring to FIG. 3, in step S1, the vehicle control unit 3 may control the storage unit 4 and the surrounding environment recognition unit 7, to recognize the lane width of the lane 30B on which the vehicle 2 is traveling. The surrounding environment recognition unit 7 may suppose that a lateral width direction of the vehicle 2 be an x axis as illustrated in (A) of FIG. 4, a heightwise direction of the vehicle 2 be a y axis as illustrated in (A) of FIG. 4, and a lengthwise direction of the vehicle 2 be a z axis as illustrated in (A) of FIG. 4, with a road surface directly below the middle of the stereo camera as the front camera 9 serving as an origin. The vehicle control unit 3 may generate distance data by a principle of triangulation from an amount of positional deviation between mutually corresponding image parts, on the basis of a set of stereo images captured in a traveling direction of the vehicle 2 by the stereo camera. The vehicle control unit 3 may acquire lane width data of the lane 30B, and store the data in the storage unit 4.

Thereafter, in step S2, the vehicle control unit 3 may control the storage unit 4 and the surrounding environment recognition unit 7, to recognize, on the basis of the distance data, the own-vehicle position, i.e., the position where the vehicle 2 is traveling in the lane 30B with respect to the lane width direction. The distance data may be generated by the triangulation in step S1 as mentioned above. The vehicle control unit 3 may acquire not only the lane width data by the triangulation as mentioned above, but also the distance data from the vehicle 2 to each of the lane markers 33 and 34 on the right and left sides, with the road surface directly below the middle of the stereo camera as mentioned above serving as the origin. The vehicle control unit 3 may store the distance data in the storage unit 4. The vehicle control unit 3 may calculate, with the image processing engine, the ratio of the lane width data to the distance data from the vehicle 2 to each of the lane markers 33 and 34 on the right and left sides, to generate relative positional data of the own vehicle with respect to the lane 30B. The vehicle control unit 3 may store the data in the storage unit 4.

Figure 4:
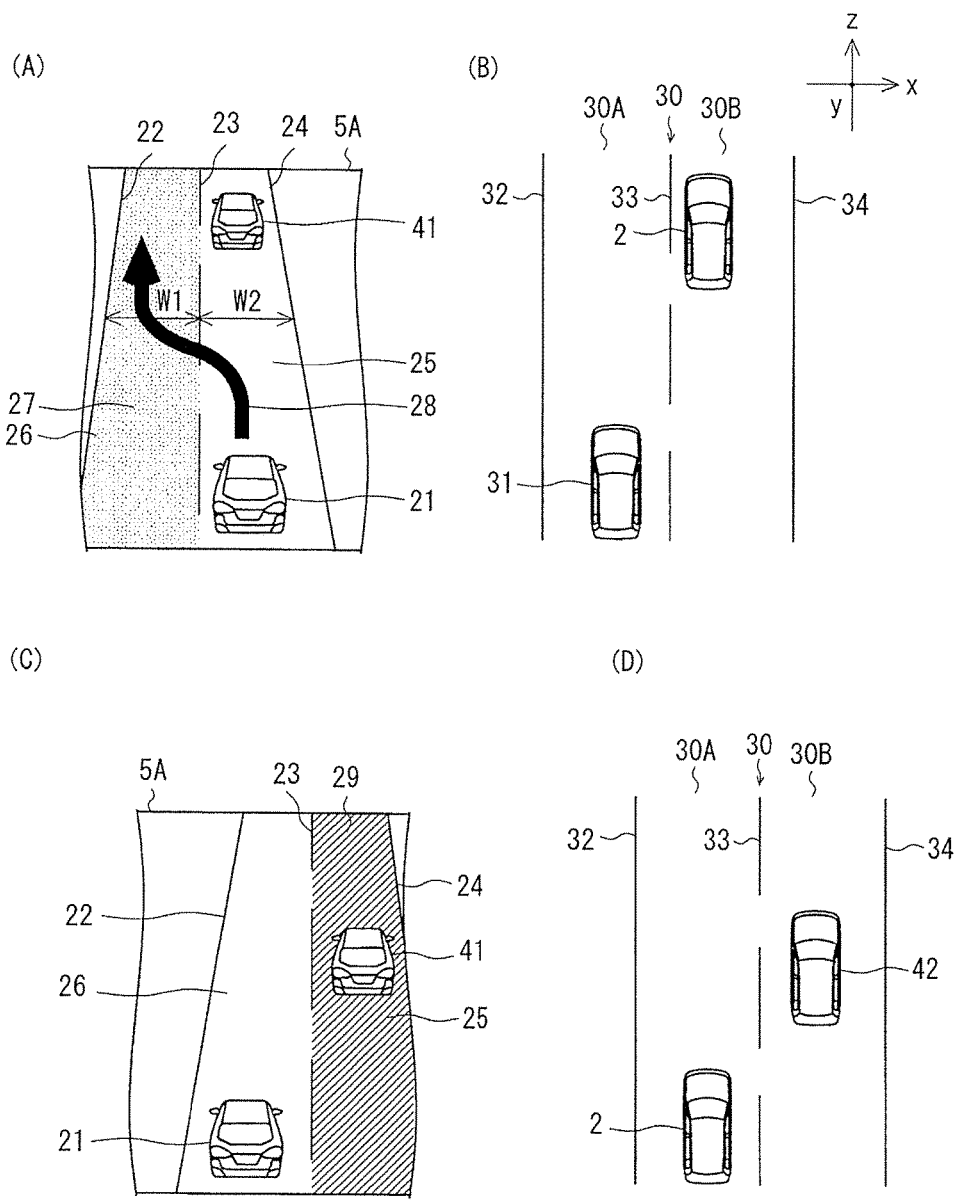
FIG. 4 illustrates the display device for the vehicle according to the implementation of the technology, with (A) and (C) illustrating display examples of the display unit, and with (B) and (D) illustrating traveling states of the vehicle on the road.

Thereafter, in step S3, the vehicle control unit 3 may control the storage unit 4 and the surrounding environment recognition unit 7, to calculate relative positional data for display, on the basis of the relative positional data as mentioned above with respect to the actual lane 30B, with reference to lane widths W1 and W2 in the display unit 5 as illustrated in (A) of FIG. 4. The lane widths W1 and W2 between the line icons 22 to 24 may be displayed on the display 5A of the display unit 5. The lane widths W1 and W2 may be constant regardless of changes in actual widths of the lanes 30A and 30B. Accordingly, the vehicle control unit 3 may calculate and generate the relative positional data for the display on the display unit 5, on the basis of the relative positional data as mentioned above with respect to the actual lane 30B. The vehicle control unit 3 may store the relative positional data for the display, in the storage unit 4.

Thereafter, in step S4, the vehicle control unit 3 may control the storage unit 4 and the surrounding environment recognition unit 7, to recognize surrounding environment of the vehicle 2, and to acquire the surrounding information of the vehicle 2. The surrounding environment recognition unit 7 may recognize, with the use of the front camera 9 and the rear camera 10, obstacles in the lane 30B on which the vehicle 2 travels and in the lane 30A as the adjacent lane. Non-limiting examples of the obstacle may include a vehicle involved in an accident, a stopped vehicle, the surrounding vehicle 31 on travel, and a falling object. In this implementation, description is targeted at the surrounding vehicle 31 on travel. As described, the vehicle control unit 3 may calculate, with the use of the surrounding environment recognition unit 7, the clearance between the surrounding vehicle 31 traveling on the lane 30A and the vehicle 2, and the relative speed of the surrounding vehicle 31 with respect to the vehicle 2. The vehicle control unit 3 may store the clearance and the relative speed, in the storage unit 4.

Thereafter, in step S5, the vehicle control unit 3 may control the storage unit 4, to perform the calculation with the use of the surrounding information of the vehicle 2, and to determine whether or not the lane change of the vehicle 2 from the lane 30B to the lane 30A is allowable. The surrounding information of the vehicle 2 has been acquired and stored in the forgoing steps S1 to S4. At this occasion, the surrounding environment recognition unit 7 may recognize, for example, blinking of a turn signal of the surrounding vehicle 31 traveling on the lane 30A, to determine whether or not to make the lane change. Alternatively, the surrounding environment recognition unit 7 may recognize, for example, not only the blinking of the turn signal of the surrounding vehicle 31 but also blinking of a turn signal of a surrounding vehicle forward or rearward on the lane 30B on which the vehicle 2 travels, to determine whether or not to make the lane change.

Thereafter, in a case where, for example, the vehicle 2 has a sufficient clearance from the surrounding vehicle 31 traveling on the lane 30A, the vehicle control unit 3 may determine that the lane change of the vehicle 2 is allowable (YES in step S5). In this case, the flow may proceed to step S6, in which the vehicle control unit 3 may control the storage unit 4 and the display unit 5, causing the display 5A of the display unit 5 to display the region 26 between the line icons 22 and 23 in blue. The region 26 may correspond to the adjacent lane. Simultaneously with the color-coded display, the display 5A may display the arrow icon 28. The arrow icon 28 may be directed toward the adjacent lane to which the lane change is allowable. It is to be noted that in FIG. 2A, the region 26 is indicated by the sandy shade 27.

Meanwhile, in a case where, for example, the relative speed of the surrounding vehicle 31 traveling on the lane 30A is high, the vehicle control unit 3 may determine that the lane change of the vehicle 2 is not allowable (NO in step S5). In this case, the flow may proceed to step S7, in which the vehicle control unit 3 may control the storage unit 4 and the display unit 5, causing the display 5A of the display unit 5 to display the region 26 between the line icons 22 and 23 in amber. The region 26 may correspond to the adjacent lane.

As described, the vehicle control unit 3 may perform the various kinds of the calculations on the basis of the surrounding information of the vehicle 2 acquired from the surrounding environment recognition unit 7, to determine whether or not the lane change of the vehicle 2 to the adjacent lane is allowable. The vehicle control unit 3 may change the display modes on the display unit 5. Hence, it is possible for the driver to intuitively grasp whether or not to make the lane change to the adjacent lane.

Specifically, JP-A No. 2002-74596 as mentioned above involves performing a detection of an obstacle rearward of a vehicle, and calling for the driver's attention on the basis of a detection result. JP-A No. H7-200996 involves performing a detection of an obstacle forward of a vehicle, and calling for the driver's attention on the basis of a detection result.

In the lane change assistance device of JP-A No. 2002-74596, a display unit displays an own-vehicle icon, and lines of segments on both sides of the own-vehicle icon. Display modes of the lines of the segments are changed, to notify a driver of a degree of uncertainties in a lane to which a lane change is to be made. However, the display unit does not display the lane to which the vehicle is going to make the lane change. Accordingly, the driver may have difficulties in grasping, on the basis of the display mode of the lines of the segments, a state of the lane to which the lane change is to be made.

Moreover, in the lane change assistance device of JP-A No. 2002-74596, the display unit displays neither the lane to which the lane change is to be made, nor surrounding vehicles. With such a display state of the display unit, the driver has difficulties in intuitively grasping the state of the lane to which the lane change is to be made, on the basis of the display contents of the display unit. In particular, usually, what the driver does for safe traveling is, for example, at most, to drive while watching an actual traveling lane through the front windshield, and to check the display in response to an alarm sound. Accordingly, the display unit is requested to provide easily visible display of the surrounding information of the vehicle, and to accurately provide the driver with the information.

Similarly, in the following distance alarm device of JP-A H7-200996 as well, the alarm equipment provides a notification method by an alarm solely in a single pattern. It is therefore difficult for the driver to grasp the degree of the uncertainties according to a level of uncertainties.

Meanwhile, in the display device 1 for the vehicle, the surrounding information of the vehicle 2 is acquired from the surrounding environment recognition unit 7. On the basis of the surrounding information of the vehicle 2, the various kinds of the calculations are made, to determine whether or not the lane change of the vehicle 2 to the adjacent lane is allowable, and to change the display modes on the display unit 5. Moreover, in this implementation, the own-vehicle icon 21 is on the fixed display, while the line icons 22, 23, and 24, and a surrounding-vehicle icon described later are on the movable display. This makes it easier for the driver to intuitively grasp the surrounding environment of the vehicle 2, and to intuitively grasp whether or not to make the lane change to the adjacent lane.

In this implementation, described is a case where the own-vehicle icon 21 and the line icons 22 to 24 are displayed with the use of, for example, the front camera 9 as the surrounding environment recognition unit 7. However, this is non-limiting. As described, the surrounding environment recognition unit 7 may combine the information on the own-vehicle position of the vehicle 2 with the detailed map database, to calculate and generate the relative positional data for the display on the display unit 5, allowing the display unit 5 to display the own-vehicle icon 21 and the line icons 22 to 24. The positioning of the vehicle 2 may be made by the GPS satellites. The detailed map database may be stored in the storage unit 4. In this case, the line icons 22 to 24 are displayed on the display unit 5, even if the driver actually fails in visually recognizing the lane markers 32 to 34. However, for example, in a case where the lane markers 32 to 34 are actually invisible to the driver because of snow, traveling with reference to the line icons 22 to 24 makes it possible to prevent the vehicle 2 from deviating from the lanes 30A and 30B.

Figure 5:
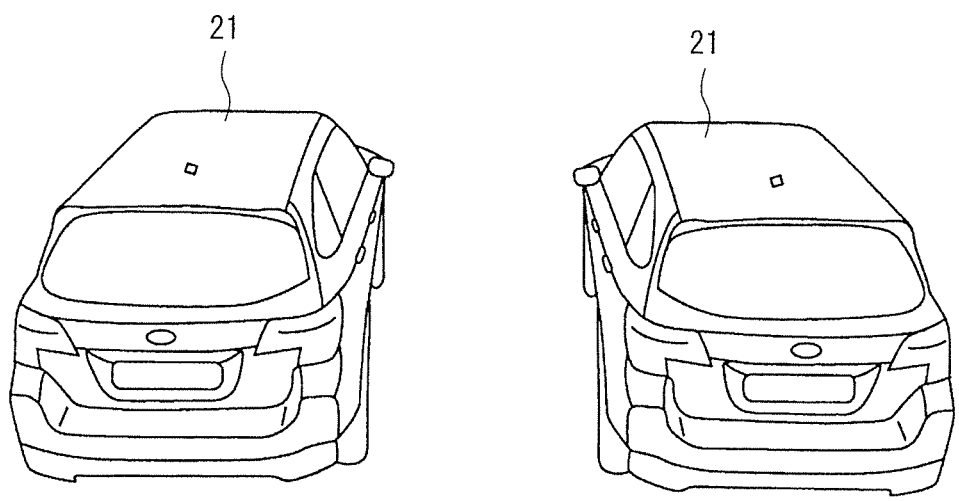
FIG. 5 illustrates a display example of the display unit of the display device for the vehicle according to the implementation of the technology.

In FIG. 4, (A) and (C) illustrate display examples of the display 5A that serves as the display unit 5 of the display device 1 for the vehicle according to this implementation. In FIG. 4, (B) and (D) illustrate actual traveling states of the vehicle 2 on the road 30, and respectively correspond to (A) and (C) of FIG. 4. FIG. 5 illustrates a display example on the display 5A that serves as the display unit 5 of the display device 1 for the vehicle according to this implementation. It is to be noted that in (A) and (C) of FIG. 4, for purposes of convenience of description, the own-vehicle icon 21 and the line icons 22 to 24 are extracted for illustration from inside the display 5A of FIG. 2A. In the description of (A) to (D) of FIG. 4, reference is made as appropriate to the description of FIGS. 1A to 3.

In FIG. 4, (A) and (B) illustrate a state in which the vehicle 2 is traveling on the lane 30B on the right side of the road 30, with the surrounding vehicle 31 traveling rearward of the vehicle 2, on the lane 30A on the left side of the road 30. As illustrated in (B) of FIG. 4, the vehicle 2 is traveling straight on the lane 30B, but is offset from the middle of the lane 30B toward the lane marker 33, with an undepicted left turn signal being lighted. Meanwhile, the surrounding vehicle 31 is traveling straight on the lane 30A, near a middle of the lane 30A. As mentioned above, the speed of the surrounding vehicle 31 is equivalent to or slightly lower than the speed of the vehicle 2. The relative speed of the surrounding vehicle 31 with respect to the vehicle 2 is low. The lane change of the vehicle 2 to the lane 30A is allowable. It is to be noted that although undepicted in (B) of FIG. 4, the surrounding environment recognition unit 7 may recognize a surrounding vehicle 42 as illustrated in (D) of FIG. 4. The surrounding vehicle 42 may be traveling forward of the vehicle 2, on the lane 30B.

As illustrated in (A) of FIG. 4, the own-vehicle icon 21 may be displayed near a lower end of the central part of the display 5A. The own-vehicle icon 21 may be constantly on the fixed display at this position, even in a case where the vehicle 2 slightly meanders in the direction of the lane width of the lane 30B, or in a case where the vehicle 2 makes, for example, the lane change. Meanwhile, the line icons 22 to 24 are on the movable display in a right-left direction in the sheet of paper, i.e., the direction of the lane width, inside the display 5A. In this example, as described with reference to (B) of FIG. 4, the vehicle 2 is traveling on the lane 30B, but is offset toward the lane marker 33. Accordingly, in (A) of FIG. 4, the line icons 22 to 24 may move to the right side in the sheet of paper in the display 5A with respect to the own-vehicle icon 21, with the line icon 23 being displayed at a closest position to the own-vehicle icon 21.

Moreover, as described with reference to (B) of FIG. 4, the surrounding environment recognition unit 7 recognizes the surrounding vehicle 31 traveling on the lane 30A, but the surrounding vehicle 31 is not displayed on the display 5A. However, as described with reference to FIG. 3, the vehicle control unit 3 determines that the lane change of the vehicle 2 to the lane 30A is allowable. The region 26 between the line icons 22 and 23 is displayed in blue, as indicated by the sandy shade 27. The region 26 corresponds to the adjacent lane. Furthermore, the arrow icon 28 may be displayed, while being directed from the region 25 corresponding to the traveling lane toward the region 26 corresponding to the adjacent lane.

Although no surrounding-vehicle icon is displayed on the display 5A illustrated in (A) of FIG. 4, the region 26 is displayed in blue, with the arrow icon 28 being further displayed. This makes it possible for the driver to intuitively grasp allowableness of the lane change to the lane 30A.

Thereafter, in (C) and (D) of FIG. 4, the vehicle 2 has finished the lane change to the lane 30A on the left side of the road 30, and is traveling straight on the lane 30A. As illustrated in (D) of FIG. 4, the vehicle 2 has made the lane change, and is traveling near the middle of the lane 30A. Meanwhile, the surrounding vehicle 42 is traveling forward of the vehicle 2, near the middle of the lane 30B. A speed of the surrounding vehicle 42 is equivalent to or slightly higher than the speed of the vehicle 2. The relative speed of the surrounding vehicle 42 with respect to the vehicle 2 is slow. Furthermore, a clearance between the surrounding vehicle 42 and the vehicle 2 is small. Accordingly, the lane change of the vehicle 2 to the lane 30B is not allowable.

As illustrated in (C) of FIG. 4, in reality, the vehicle 2 is moving from the right side to the left side in the sheet of paper. In the display of the display 5A, however, the own-vehicle icon 21 is on the fixed display near the lower end of the central part of the display area, while the line icons 22 to 24 are displayed while moving to the right side in the sheet of paper in the display 5A, with respect to the own-vehicle icon 2L The own-vehicle icon 21 is on the fixed display in the display 5A, while a surrounding-vehicle icon 41 may be on movable display in the right-left direction in the sheet of paper, i.e., the direction of the lane width, in the display 5A. In reality, the surrounding vehicle 42 is traveling on the lane 30B without making a lane change. In the display of the display 5A, however, the surrounding-vehicle icon 41 is displayed while moving to the right side in the sheet of paper together with the line icons 22 to 24. In this implementation, the own-vehicle icon 21 is on the fixed display, while the surrounding-vehicle icon 41 may be on the movable display. Accordingly, the surrounding-vehicle icon 41 may move to above the own-vehicle icon 21, to the upper right side of the own-vehicle icon 21, or to the upper left side of the own-vehicle icon 21, or alternatively, be eliminated from the display area, in accordance with a result of the lane change of the vehicle 2.

In one implementation of the technology, the surrounding vehicle 42 may serve as a "second vehicle". In one implementation of the technology, the surrounding-vehicle icon 41 may serve as a "second vehicle icon".

Moreover, as described with reference to FIG. 3 and (D) of FIG. 4, in a case with presence of the surrounding vehicle 42 traveling on the lane 30B, the vehicle control unit 3 may determine that the lane change of the vehicle 2 to the lane 30B is not allowable. Upon this determination, the region 25 between the line icons 23 and 24 may be displayed in amber. The region 25 may correspond to the adjacent lane. It is to be noted that in (C) of FIG. 4, the lane change of the vehicle 2 causes the region 26 between the line icons 22 and 23 to correspond to the traveling lane, and causes the region 25 between the line icons 23 and 24 to correspond to the adjacent lane.

As illustrated in (C) of FIG. 4, the display 5A may display the surrounding-vehicle icon 41 near the own-vehicle icon 21, with the region 25 being displayed in amber. This makes it possible for the driver to intuitively grasp non-allowableness of the lane change to the lane 30B.

Widths of regions between the line icons 22 to 24, i.e., the lane widths W1 and W2 on display as illustrated in (A) of FIG. 4 may be constant regardless of the changes in the actual widths of the lanes 30A and 30B as illustrated in (B) of FIG. 4. With this way of display, the line icons 22 to 24 may move in the right-left direction in the sheet of paper in accordance with the clearance from the own-vehicle icon 21, instead of moving in the right-left direction in the sheet of paper in accordance with the actual widths of the lanes 30A and 30B. In other words, an amount of movement of the line icons 22 to 24 is set to a minimum value. This prevents the line icons 22 to 24 from being on flickering display, and causing the driver difficulties in seeing the line icons 22 to 24.

When the driver actually drives the vehicle 2, it is supposed that many drivers visually have feeling that they are driving the vehicle 2 along the traveling lane, instead of feeling that the vehicle 2 is traveling while slightly meandering rightward and leftward in the traveling lane. Accordingly, allowing the display 5A to provide the fixed display of the own-vehicle icon 21 and the movable display of the line icons 22 to 24 with respect to the own-vehicle icon 21 makes it possible to provide display in consistency with a view the driver actually gets. Hence, it is easy for the driver to intuitively and accurately grasp the position of the vehicle 2 in the traveling lane.

Moreover, the line icons 22 to 24 are displayed, with clearances between the line icons 22 to 24 narrowing as goes upward in the sheet of paper, i.e., as is farther away from the own-vehicle icon 21. This way of display also provides display in consistency with perspective of the view the driver actually gets. Hence, it is possible for the driver to easily and intuitively grasp information on the traveling lane forward.

As described, in this implementation, described is a case where the surrounding environment recognition unit 7 may constantly recognize the obstacle such as the surrounding vehicles 31 and 42 on the traveling lane or the adjacent lane, and determine whether or not the lane change of the vehicle 2 to the adjacent lane is allowable, for the display on the display 5A. However, this is non-limiting. For example, the determination may be made as to whether or not the lane change of the vehicle 2 to the adjacent lane is allowable, for the display on the display 5A, in a case where the driver operates the turn signal, hoping for the lane change of the vehicle 2. Similarly, for example, in automatic operation, the determination may be made as to whether or not the lane change of the vehicle 2 to the adjacent lane is allowable, for the display on the display 5A, in a case where the vehicle 2 is going to make the lane change.

Moreover, for example, as illustrated in FIG. 5, in a case where the surrounding environment recognition unit 7 recognizes a change in the yaw angle of the vehicle 2, e.g., because of the lane change of the vehicle 2, the own-vehicle icon 21 may be on inclined display toward a direction of the yaw angle recognized. Hence, it is possible for the driver to grasp a traveling direction of the vehicle 2 in the lanes 30A and 30B on the basis of a change in a display mode of the own-vehicle icon 21. Similarly, in the automatic operation, it is possible for an occupant to grasp, in advance, a planned lane change of the vehicle 2 on the basis of the inclined display of the own-vehicle icon 21. Hence, it is possible to prevent the occupant from being surprised at an abrupt lane change. It is to be noted that FIG. 5 illustrates a case where a display position of the own-vehicle icon 21 is fixed, and the own-vehicle icon 21 is on the inclined display at the fixed position.

Moreover, in this implementation, described is a case where the vehicle 2 travels on the road including two lanes on each side. However, this is non-limiting. For example, in a case where the vehicle 2 travels on a road including three lanes on each side, allowing the display unit 5 to provide the fixed display of the own-vehicle icon of the vehicle 2, and the movable display of the line icons of the lane markers of the road in the right-left direction makes it possible to produce similar effects.

Furthermore, in this implementation, described is a case of the color-coded display of the regions 25 and 26 in the display 5A. The regions 25 and 26 may correspond to the adjacent lane. However, this is non-limiting. For example, in a case where the surrounding vehicle 42 is traveling with a certain clearance or less from the vehicle 2, the color-coded display of the surrounding-vehicle icon 41 may be provided according to the clearance. In this case as well, it is possible for the driver to intuitively grasp the sense of distance from the surrounding vehicle on the basis of the display mode of the surrounding-vehicle icon 41.

According to a display device for a vehicle of one implementation of the technology, a surrounding environment recognition unit recognizes surrounding information of an own vehicle. The surrounding information is displayed on a display unit. In displaying the surrounding information, an own-vehicle icon is on fixed display, while line icons are on movable display in a lateral direction of the display unit. A region in a display area is on color-coded display according to presence or absence of an obstacle. The region corresponds to an adjacent lane. With this way of display, it is possible for the driver to grasp, more accurately and intuitively, a state of the adjacent lane, on the basis of the color-coded display, in making a lane change. Hence, it is possible for the driver to make the lane change with enhanced safety.

Moreover, according to the display device for the vehicle of the implementation of the technology, the surrounding environment recognition unit may recognize an obstacle and any other object in the adjacent lane. On the basis of a recognition result, the color-coded display of the region in the display area may be constantly provided. The region in the display area corresponds to the adjacent lane. With this way of display, it is possible for the driver to constantly acquire information on the adjacent lane to which the lane change is to be made, by checking the display area.

Furthermore, according to the display device for the vehicle of the implementation of the technology, the surrounding environment recognition unit may recognize the obstacle and any other object in the adjacent lane. In a case where an operation is made by the driver to make the lane change to the adjacent lane, the color-coded display of the region in the display area may be provided on the basis of the recognition result. The region corresponds to the adjacent lane. With this way of display, it is possible for the display unit to provide the driver with necessary information as appropriate, while displaying various kinds of the surrounding information of the vehicle.

In addition, according to the display device for the vehicle of the implementation of the technology, an arrow icon may be displayed, in a case where no obstacle or any other object is recognized by the surrounding environment recognition unit. The arrow icon may be directed from a traveling lane of the own vehicle toward the adjacent lane to which the lane change is to be made. With this way of display, it is possible for the driver to make the lane change to the adjacent lane with enhanced safety, by checking display of the arrow icon in addition to the color-coded display.

Moreover, according to the display device for the vehicle of the implementation of the technology, the own-vehicle icon may be on the fixed display at a predetermined position, while being on inclined display toward a direction of a lane width at the position. With this way of display, it is possible for the driver to intuitively determine a direction of the lane change of the own vehicle on the basis of a direction of inclination of the own-vehicle icon as well.

Furthermore, according to the display device for the vehicle of the implementation of the technology, the display unit may provide the movable display of the line icons and an adjacent-lane line icon in an opposite direction to the direction of the lane change of the own vehicle. With this way of display, it is possible to allow the display unit to provide the fixed display of the own-vehicle icon, and to allow the display unit to provide the display in consistency with a view the driver actually gets. Hence, it is possible for the driver to intuitively and easily grasp the surrounding information of the own vehicle.

In addition, according to the display device for the vehicle of the implementation of the vehicle, the display unit may display a surrounding-vehicle icon, in a case where the surrounding environment recognition unit recognizes a surrounding vehicle as the obstacle in the adjacent lane. With this way of display, it is possible for the driver to grasp presence of the surrounding vehicle that is traveling on the adjacent lane, on the basis of display of the surrounding-vehicle icon.

Moreover, according to the display device for the vehicle of the implementation of the technology, after the own vehicle makes the lane change, the surrounding environment recognition unit may acquire the surrounding information of the vehicle, to cause the movable display of the line icons, the adjacent-lane line icon, and the surrounding-vehicle icon in the display unit, or to cause their elimination from the display unit. With this way of display, it is possible for the driver to accurately grasp states of the traveling lane and the adjacent lane after making the lane change.

Furthermore, according to the display device for the vehicle of the implementation of the technology, the surrounding-vehicle icon may be on color-coded display according to a clearance between the own vehicle and the surrounding vehicle. With this way of display, it is possible for the driver to intuitively grasp the clearance from the surrounding vehicle on the basis of a display color of the surrounding-vehicle icon. Hence, it is possible to make the lane change with enhanced safety.

In addition, according to the display device for the vehicle of the implementation of the technology, the surrounding environment recognition unit may include a camera, radar, or a communication unit, or any combination thereof. The camera, the radar, and the communication equipment may be provided in the own vehicle. With this configuration, it is possible to acquire the surrounding information of the own vehicle by various methods, in accordance with the road surface states, the traveling environment, and other circumstances.

In one implementation described above, the vehicle control unit 3, the display unit 5, and the surrounding environment recognition unit 7 illustrated in FIG. I may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle control unit 3, the display unit 5, and the surrounding environment recognition unit 7. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 1.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A display device for a vehicle, the display device comprising:
   a surrounding environment recognition unit configured to recognize surrounding environment of a first vehicle as an own vehicle; and
   a display unit that includes a display area and is configured to display, in the display area, information to be notified to a driver, on a basis of a recognition result of the surrounding environment recognition unit,
   the display unit being configured to display a first vehicle icon substantially in a middle of the display area in a lateral direction of the display area, the first vehicle icon corresponding to the first vehicle,
   the display unit being configured to display line icons on right and left sides of the first vehicle icon on a condition that the surrounding environment recognition unit recognizes lane markers on right and left sides of an own-vehicle-traveling lane on which the first vehicle travels, the line icons corresponding to the lane markers of the own-vehicle-traveling lane,
   the display unit being configured to display an adjacent-lane line icon sideward of a corresponding one of the line icons on a condition that the surrounding environment recognition unit recognizes a lane marker of an adjacent lane that is adjacent to the own-vehicle-traveling lane, the adjacent-lane line icon corresponding to the lane marker of the adjacent lane,
   the line icons and the adjacent-lane line icon being displayed, with a clearance between the line icons narrowing as is farther away from the first vehicle icon, and with a clearance between the corresponding one of the line icons and the adjacent-lane line icon narrowing as is farther away from the first vehicle icon,
   the first vehicle icon being on fixed display,
   the line icons and the adjacent-lane line icon being on movable display, in the lateral direction of the display area,
   the surrounding environment recognition unit being configured to recognize presence or absence of an obstacle in the adjacent lane, and
   the display unit being configured to provide color-coded display of a display region between the corresponding one of the line icons and the adjacent-lane line icon, according to the presence or the absence of the obstacle in the adjacent lane, the display region corresponding to the adjacent lane.

2. The display device for the vehicle according to claim 1, wherein
   with the surrounding environment recognition unit recognizing the lane marker of the adjacent lane, the display unit constantly provides the color-coded display of the display region between the corresponding one of the line icons and the adjacent-lane line icon, according to the presence or the absence of the obstacle in the adjacent lane.

3. The display device for the vehicle according to claim 2, wherein
with the surrounding environment recognition unit recognizing the absence of the obstacle in the adjacent lane, the display unit displays an arrow icon that is directed from a display region corresponding to the own-vehicle-traveling lane to the display region corresponding to the adjacent lane.

4. The display device for the vehicle according to claim 2, wherein
with the surrounding environment recognition unit recognizing a lane change of the first vehicle from the own-vehicle-traveling lane to the adjacent lane, the display unit provides an inclined display of the first vehicle icon toward a direction of the lane change.

5. The display device for the vehicle according to claim 4, wherein
the display unit provides the movable display of the line icons and the adjacent-lane line icon in an opposite direction to a direction of movement of the lane change of the first vehicle.

6. The display device for the vehicle according to claim 2, wherein
with the surrounding environment recognition unit recognizing a second vehicle as the obstacle in the adjacent lane, the display unit displays a second vehicle icon between the corresponding one of the line icons and the adjacent-lane line icon, the second vehicle being a vehicle different from the first vehicle, and the second vehicle icon corresponding to the second vehicle.

7. The display device for the vehicle according to claim 6, wherein
with the first vehicle having made the lane change from the own-vehicle-traveling lane to the adjacent lane, the display unit provides the movable display of the line icons and the adjacent-lane line icon, while providing movable display of the second vehicle icon to above the first vehicle icon, or while eliminating the second vehicle icon from the display area.

8. The display device for the vehicle according to claim 6, wherein
the display unit provides color-coded display of the second vehicle icon, according to a clearance between the first vehicle and the second vehicle.

9. The display device for the vehicle according to claim 2, wherein
the surrounding environment recognition unit includes a camera, radar, or a communication unit, or any combination thereof, the camera, the radar, the communication unit being disposed in the first vehicle.

10. The display device for the vehicle according to claim 1, wherein
with the surrounding environment recognition unit recognizing the lane marker of the adjacent lane, the display unit provides the color-coded display of the display region between the corresponding one of the line icons and the adjacent-lane line icon according to the presence or the absence of the obstacle in the adjacent lane on a condition that an operation of a lane change of the first vehicle from the own-vehicle-traveling lane to the adjacent lane is made.

11. The display device for the vehicle according to claim 1, wherein
with the surrounding environment recognition unit recognizing the absence of the obstacle in the adjacent lane, the display unit displays an arrow icon that is directed from a display region corresponding to the own-vehicle-traveling lane to the display region corresponding to the adjacent lane.

12. The display device for the vehicle according to claim 1, wherein
with the surrounding environment recognition unit recognizing a lane change of the first vehicle from the own-vehicle-traveling lane to the adjacent lane, the display unit provides an inclined display of the first vehicle icon toward a direction of the lane change.

13. The display device for the vehicle according to claim 12, wherein
the display unit provides the movable display of the line icons and the adjacent-lane line icon in an opposite direction to a direction of movement of the lane change of the first vehicle.

14. The display device for the vehicle according to claim 1, wherein
with the surrounding environment recognition unit recognizing a second vehicle as the obstacle in the adjacent lane, the display unit displays a second vehicle icon between the corresponding one of the line icons and the adjacent-lane line icon, the second vehicle being a vehicle different from the first vehicle, and the second vehicle icon corresponding to the second vehicle.

15. The display device for the vehicle according to claim 14, wherein
with the first vehicle having made the lane change from the own-vehicle-traveling lane to the adjacent lane, the display unit provides the movable display of the line icons and the adjacent-lane line icon, while providing movable display of the second vehicle icon to above the first vehicle icon, or while eliminating the second vehicle icon from the display area.

16. The display device for the vehicle according to claim 14, wherein
the display unit provides color-coded display of the second vehicle icon, according to a clearance between the first vehicle and the second vehicle.

17. The display device for the vehicle according to claim 1, wherein
the surrounding environment recognition unit includes a camera, radar, or a communication unit, or any combination thereof, the camera, the radar, the communication unit being disposed in the first vehicle.

18. A display device for a vehicle, the display device comprising:
a detector configured to detect surrounding environment of a first vehicle as an own vehicle;
a display configured to include a display area and displays, in the display area, information to be notified to a driver; and
circuitry configured to allow the display to display the information on a basis of a detection result of the detector,
the circuitry being configured to
cause a first vehicle icon to be displayed substantially in a middle of the display area in a lateral direction of the display area, the first vehicle icon corresponding to the first vehicle,
cause line icons to be displayed on right and left sides of the first vehicle icon upon recognizing, on the basis of the detection result of the detector, lane markers on right and left sides of an own-vehicle-traveling lane on which the first vehicle travels, the line icons corresponding to the lane markers of the own-vehicle-traveling lane, cause an adjacent-lane line icon to be displayed sideward of a corresponding one of the line icons upon recognizing, on the basis of the detection result of the detector, a lane marker of an adjacent lane that is adjacent to the own-vehicle-traveling lane, the adjacent-lane line icon corresponding to the lane marker of the adjacent lane, cause the line icons and the adjacent-lane line icon to be displayed, with a clearance between the line icons narrowing as is farther away from the first vehicle icon, and with a clearance between the corresponding one of the line icons and the adjacent-lane line icon narrowing as is farther away from the first vehicle icon, cause the first vehicle icon to be on fixed display, cause the line icons and the adjacent-lane line icon to be on movable display, in the lateral direction of the display area, and recognize presence or absence of an obstacle in the adjacent lane, and provide color-coded display of a display region between the corresponding one of the line icons and the adjacent-lane line icon, according to the presence or the absence of the obstacle in the adjacent lane, the display region corresponding to the adjacent lane.

* * * * *